United States Patent
Milanfar et al.

(10) Patent No.: US 10,929,952 B2
(45) Date of Patent: Feb. 23, 2021

(54) IMAGE UPSCALING

(71) Applicant: Google LLC, Mountain View, CA (US)

(72) Inventors: Peyman Milanfar, Menlo Park, CA (US); Yaniv Romano, Kiryat Ata (IL)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 15/970,393

(22) Filed: May 3, 2018

(65) Prior Publication Data

US 2018/0253826 A1    Sep. 6, 2018

Related U.S. Application Data

(63) Continuation of application No. 15/000,670, filed on Jan. 19, 2016, now Pat. No. 9,996,902.

(51) Int. Cl.
*G06T 3/40* (2006.01)
*G06K 9/46* (2006.01)
(Continued)

(52) U.S. Cl.
CPC .......... *G06T 3/4053* (2013.01); *G06K 9/4604* (2013.01); *G06T 3/40* (2013.01);
(Continued)

(58) Field of Classification Search
None
See application file for complete search history.

(56) References Cited

U.S. PATENT DOCUMENTS 6,330,372 B1   12/2001   Goldstein et al.
7,330,209 B2   2/2008    Osamato
(Continued)

FOREIGN PATENT DOCUMENTS

CN    103455988    12/2013
JP    H08-331377   12/1996
(Continued)

OTHER PUBLICATIONS

"Difference of Gaussians Edge Enhancement Algorithm," Olympus Microscopy Resource Center, retrieved on Oct. 28, 2015, retrieved from the Internet: URL<http://olympusmicro.com/primer/java/digitalimaging/processing/diffgaussians/index.html>, 2 pages.
(Continued)

*Primary Examiner* — Jiangeng Sun
(74) *Attorney, Agent, or Firm* — Fish & Richardson P.C.

(57) ABSTRACT

Methods, systems, and apparatus, including computer programs encoded on computer storage media, for upscaling an image. One of the methods includes upscaling a low resolution image, creating first pixel subsets of the first upscaled image, creating second pixel subsets of a high resolution image, determining, for each subset in the pixel subsets, a value of a property of the pixel subset, determining, for each subset in the pixel subsets, a group of subsets to which the corresponding pixel subset belongs using the value of the property, and determining, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image.

20 Claims, 8 Drawing Sheets

(51) Int. Cl.
   *G06T 5/00* (2006.01)
   *G06T 5/50* (2006.01)
(52) U.S. Cl.
   CPC .............. *G06T 3/403* (2013.01); *G06T 5/003* (2013.01); *G06T 5/50* (2013.01); *G06T 2207/20024* (2013.01); *G06T 2207/20081* (2013.01); *G06T 2207/20221* (2013.01); *G06T 2210/36* (2013.01)

(56) References Cited

U.S. PATENT DOCUMENTS

| | | | |
|---|---|---|---|
| 8,655,109 B2* | 2/2014 | Lin | G06N 20/00 382/299 |
| 8,675,105 B2 | 3/2014 | Lansel et al. | |
| 9,734,559 B1* | 8/2017 | Liu | G06T 3/4053 |
| 2005/0196044 A1 | 9/2005 | Nagahashi | |
| 2008/0036792 A1 | 2/2008 | Liang et al. | |
| 2010/0260433 A1 | 10/2010 | Zhang et al. | |
| 2011/0141368 A1 | 6/2011 | Wallace | |
| 2013/0034313 A1 | 2/2013 | Lin et al. | |
| 2014/0301661 A1 | 10/2014 | Voronov et al. | |
| 2014/0368549 A1* | 12/2014 | Lin | G06T 3/4076 345/660 |
| 2015/0269708 A1 | 9/2015 | Porikli et al. | |
| 2016/0027148 A1* | 1/2016 | Choudhury | G06T 3/4076 382/254 |

FOREIGN PATENT DOCUMENTS

| | | |
|---|---|---|
| JP | 2011-171843 | 9/2011 |
| JP | 2013-235594 A | 11/2013 |
| JP | 2017-500651 | 1/2017 |
| WO | WO 2015/198368 | 12/2015 |

OTHER PUBLICATIONS

"Difference of Gaussians," from Wikipedia, the free encyclopedia, last modified on Oct. 15, 2015 [retrieved on Oct. 28, 2015]. Retrieved from the Internet: URL<https://en.wikipedia.org/wiki/Difference_of_Gaussians>, 4 pages.

"Image scaling," from Wikipedia, the free encyclopedia, last modified on Oct. 27, 2015 [retrieved on Dec. 10, 2015]. Retrieved from the Internet: URL<https://en.wikipedia.org/wiki/Image_scaling>, 11 pages.

D'Angelo and Vandergheynst, "Fully Non-Local Super-Resolution via Spectral Hashing," 2011 IEEE International Conference on Acoustics, Speech and Signal Processing (ICASSP), May 2011, pp. 1137-1140.

Dai et al., "Jointly Optimized Regressors for Image Super-resolution," EUROGRAPHICS 2015, vol. 34, No. 2, 2015, 10 pages.

Dong et al., "Image Super-Resolution Using Deep Convolutional Networks," Microsoft Research, retrieved on Oct. 28, 2015, retrieved from the Internet: URL<http://mmlab.ie.cuhk.edu.hk/projects/SRCNN.html>, 2 pages.

Dong et al., "Image Super-Resolution Using Deep Convolutional Networks," arXiv:1501.00092v3 [cs.CV], Jul. 2015, pp. 1-14.

Feng, "Analysis and Approaches to Image Local Orientation Estimation," Master Thesis, University of California Santa Cruz, Mar. 2003, 79 pages.

Fisher et al., "Laplacian/Laplacian of Gaussian," Spatial Filters, 2003 [retrieved on Oct. 28, 2015]. Retrieved from the Internet: URL<http://homepages.inf.ed.ac.uk/rbf/HIPP2/log.htm>, 7 pages.

Germain et al. "Efficient Illuminant Correction in the Local, Linea, Learned (L3) Method," Proc. SPIE 9404, Feb. 27, 2015, pp. 1-7.

Glasner et al., "Super-Resolution from a Single Image," 2009 IEEE 12th International Conference on Computer Vision, Sep.-Oct. 2009, pp. 349-356.

Huang et al., "Single Image Super-resolution from Transformed Self-Exemplars," 2015 IEEE Conference on Computer Vision and Pattern Recognition (CVPR), Jun. 2015, pp. 5197-5206.

International Search Report and Written Opinion in International Application No. PCT/US2016/065338, dated Feb. 24, 2017, 14 pages.

Jamshy, "Keypoint Filtering using Machine Learning," Master Thesis, Tel Aviv University, May 2009, 76 pages.

Jiang et al. "Locally regularized Anchored Neighborhood Regression for fast Super-Resolution," 2015 IEEE International Conference on Multimedia and Expo, Jun. 29, 2015, pp. 1-6.

Lansel, "Local Linear Learned Method for Image and Reflectance Estimation," Stanford University, 2011, pp. 1-125.

Paris et al., "Capture of Hair Geometry from Multiple Images," Proceeding SIGGRAPH '04 ACM SIGGRAPH 2004 Papers, pp. 712-719, Aug. 2004.

Peleg and Elad, "A Statistical Prediction Model Based on Sparse Representations for Single Image Super-Resolution," IEEE Transactions on Image Processing, 23(6):2569-2582, Feb. 2014.

Radu et al. "Anchored Neighborhood Regression for Fast Example-Based Super-Resolution," 2013 IEEE International Conference on Computer Vision, IEEE, Dec. 1, 2013, 8 pages.

Romano et al. "Single Image Interpolation via Adaptive nonlocal Sparsity-Based Modeling," IEEE Transactions on Image Processing, IEEE Service Center, Piscataway, NJ, US, vol. 23, No. 7, Jul. 1, 2014, 14 pages.

Schuller et al., "Fast and Accurate Image Upscaling with Super-Resolution Forests," 2015 IEEE Conference on Computer Vision and Pattern Recognition (CVPR), Jun. 2015, pp. 3791-3799.

Staelin et al., "Neural Network Image Scaling Using Spatial Errors," HP Laboratories Israel Technical Report HPL-2003-26 (R.1), Oct. 30, 2003, 12 pages.

Tian et al. "Automatically Designing an Image Processing Pipeline for a Five-band Camera Prototype using the Local, Linea, Learned (L3) Method," Proc. SPIE 9404, Feb. 27, 2015, pp. 1-6.

Tian et al. "Automating the Design of Image Processing Pipelines for Novel Color Filter Arrays: Local, Linear, Learned (L3) Method," Proc. SPIE 9023, Mar. 7, 2014, pp. 1-8.

Yang et al., "Image Super-Resolution via Sparse Representation," IEEE Transactions on Image Processing, 19(11):2861-2873, May 2010.

Extended European Search Report in European Application No. 19207931.7, dated Feb. 27, 2020, 10 pages.

IN Office Action in Indian Application No. 201847014515, dated Sep. 21, 2020, 6 pages (with English translation).

JP Office Action in Japanese Application No. 2019-32606, dated Jun. 8, 2020, 11 pages (with English translation).

* cited by examiner

```
600
```

```
┌─────────────────────────────────────────────────────────────┐
│ Receive a low resolution image with a first resolution that │
│ depicts particular content                              602 │
└─────────────────────────────────────────────────────────────┘
                             │
                             ▼
┌─────────────────────────────────────────────────────────────┐
│ Upscale the low resolution image to a second resolution     │
│ greater than the first resolution to create an upscaled     │
│ image                                                   604 │
└─────────────────────────────────────────────────────────────┘
                             │
                             ▼
┌─────────────────────────────────────────────────────────────┐
│ Create pixel subsets of the upscaled image, each subset in  │
│ the pixel subsets having a size, each pixel in the upscaled │
│ image included in a subset in the pixel subsets         606 │
└─────────────────────────────────────────────────────────────┘
                             │
                             ▼
┌─────────────────────────────────────────────────────────────┐
│ Determine, for each subset in the pixel subsets, a value of │
│ a property of the pixel subset                          608 │
└─────────────────────────────────────────────────────────────┘
                             │
                             ▼
┌─────────────────────────────────────────────────────────────┐
│ Determine, for each subset in the pixel subsets, a group of │
│ subsets to which the pixel subset belongs using the value   │
│ of the property of the pixel subset, each pixel subset      │
│ included in one and only one group                      610 │
└─────────────────────────────────────────────────────────────┘
                             │
                             ▼
┌─────────────────────────────────────────────────────────────┐
│ Apply, for each of the groups of subsets, a filter to each  │
│ of the pixel subsets in the group to create a final pixel   │
│ subset, a combination of all of the final pixel subsets     │
│ representing a higher resolution image of the content with  │
│ a third resolution greater than the first resolution    612 │
└─────────────────────────────────────────────────────────────┘
                             │
                             ▼
┌─────────────────────────────────────────────────────────────┐
│ Determine weights with which to combine the pixel subsets   │
│ and the final pixel subsets                             614 │
└─────────────────────────────────────────────────────────────┘
                             │
                             ▼
┌─────────────────────────────────────────────────────────────┐
│ Generate a final image by combining the pixel subsets and   │
│ the final pixel subsets with the weights                616 │
└─────────────────────────────────────────────────────────────┘
                             │
                             ▼
┌─────────────────────────────────────────────────────────────┐
│ Provide the final image for presentation                618 │
└─────────────────────────────────────────────────────────────┘
```

FIG. 6

IMAGE UPSCALING

CROSS-REFERENCE TO RELATED APPLICATION

This application is a continuation of U.S. application Ser. No. 15/000,670, filed Jan. 19, 2016, the contents of which are incorporated by reference herein.

BACKGROUND

A system may upscale an image for presentation on a higher resolution display. For example, a system may receive a picture or a frame from a video stream and upscale the image from a lower resolution to a higher resolution. The system may display the upscaled picture or frame on the display, e.g., so that the image fills the entire display.

Various systems use filters that are derived from training data of corresponding pairs of low and high resolution images. The filters that are then learned are applied to a low resolution image that is not in the training set to produce a higher resolution version of the image that has more pixels and contains more detailed spatial and color information than the low resolution image.

SUMMARY

In some implementations, an upscaling system generates a high resolution image from a low-resolution image. The upscaling system may use a lightweight interpolation method to generate an initial upscaled image. Some examples of the lightweight interpolation method include linear interpolation, bilinear interpolation, bicubic interpolation, and lanczos resampling.

The upscaling system learns a filter from a training data-set and applies the filter to the initial upscaled image to improve the quality of the initial upscaled image and generate a higher quality image. The upscaling system may learn multiple filters and apply the filters to patches or groups of pixels in the initial upscaled image.

In some examples, the upscaling system selectively blends the initial upscaled image and the higher quality image during runtime to generate a final image. The upscaling system may use different weights for each pixel or for groups of pixels when selectively blending the initial upscaled image and the higher quality image.

In some implementations, runtime and training processes may start with low resolution images of size N×N and generate an upscaled image with size kN×kN, which is a target resolution. During training, an upscaling training system compares patches from the upscaled kN×kN image and patches from a target high resolution image of the same size, i.e., kN×kN. During runtime, an upscaling runtime system generates an upscaled image of size kN×kN and applies the filters, learned during training, to patches in the upscaled image to produce a higher quality image of the same size, i.e., kN×kN. The runtime upscaling system may provide the higher quality image to a device for presentation to a user, e.g., on a display of a mobile device.

In general, one innovative aspect of the subject matter described in this specification can be embodied in methods that include the actions of upscaling a low resolution image with a first resolution that depicts particular content to a second resolution greater than the first resolution to create a first upscaled image, creating first pixel subsets of the first upscaled image, each subset in the first pixel subsets having a first size, each pixel in the first upscaled image included in a subset in the first pixel subsets, creating second pixel subsets of a high resolution image with a third resolution, greater than the first resolution, that depicts the particular content, each subset in the second pixel subsets having a second size, each pixel in the high resolution image included in a subset in the second pixel subsets, a quantity of the first pixel subsets being the same as a quantity of the second pixel subsets and each of the first pixel subsets corresponding to a respective one of the second pixel subsets, determining, for each subset in the first pixel subsets or for each subset in the second pixel subsets, a value of a property of the pixel subset, determining, for each subset in the first pixel subsets or for each subset in the second pixel subsets, a group of subsets to which the corresponding pixel subset belongs using the value of the property of the corresponding pixel subset, each pixel subset included in one and only one group, and determining, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of upscaling, using a processor, a low resolution image with a first resolution that depicts particular content to a second resolution greater than the first resolution to create a first upscaled image, creating first pixel subsets of the first upscaled image, each subset in the first pixel subsets having a first size, each pixel in the first upscaled image included in a subset in the first pixel subsets, creating second pixel subsets of a high resolution image with a third resolution, greater than the first resolution, that depicts the particular content, each subset in the second pixel subsets having a second size, each pixel in the high resolution image included in a subset in the second pixel subsets, a quantity of the first pixel subsets being the same as a quantity of the second pixel subsets and each of the first pixel subsets corresponding to a respective one of the second pixel subsets, determining, for each subset in the first pixel subsets or for each subset in the second pixel subsets, a value of a property of the corresponding pixel subset, determining, for each subset in the first pixel subsets or for each subset in the second pixel subsets, a group of subsets to which the corresponding pixel subset belongs using the value of the property of the corresponding pixel subset, each pixel subset included in one and only one group, and determining, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of creating first pixel subsets of a low resolution image with a first resolution that depicts particular content, each subset in the first pixel subsets having a first size, each pixel in the low resolution image included in a subset in the first pixel subsets, creating second pixel subsets of a high resolution image with a second resolution, greater than the first resolution, that depicts the particular content, each subset in the second pixel subsets having a second size, each pixel in the high resolution image included in a subset in the second pixel subsets, a quantity of the first pixel subsets being the same as a quantity of the second pixel subsets and each of the first pixel subsets corresponding to a respective one of the second pixel subsets, determining, for each subset in the first pixel subsets or for each subset in the second pixel subsets, a value of a property of the corresponding pixel subset, determining, for each subset in the first pixel subsets or for each subset in the second pixel subsets, a group of subsets to which the corresponding pixel subset belongs using the value of the property of the corresponding pixel subset, each pixel subset included in one and only one group, upscaling the low resolution image to create a first upscaled image with to a third resolution greater than the first resolution, and determining, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of upscaling a low resolution image with a first resolution that depicts particular content to a second resolution greater than the first resolution to create a first upscaled image, creating first pixel subsets of the first upscaled image, each subset in the first pixel subsets having a first size, each pixel in the first upscaled image included in a subset in the first pixel subsets, creating second pixel subsets of a high resolution image with a third resolution, greater than the first resolution, that depicts the particular content, each subset in the second pixel subsets having a second size, each pixel in the high resolution image included in a subset in the second pixel subsets, a quantity of the first pixel subsets being the same as a quantity of the second pixel subsets and each of the first pixel subsets corresponding to a respective one of the second pixel subsets, determining, for each subset in the first pixel subsets or for each subset in the second pixel subsets, a value of a property of the corresponding pixel subset, determining, for each subset in the first pixel subsets or for each subset in the second pixel subsets, a group of subsets to which the corresponding pixel subset belongs using the value of the property of the corresponding pixel subset, each pixel subset included in one and only one group, and determining, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving the low resolution image, and receiving the high resolution image. Upscaling the low resolution image with the first resolution that depicts particular content to the second resolution greater than the first resolution to create the first upscaled image may include upscaling the low resolution image to the third resolution of the high resolution image. Creating the second pixel subsets of the high resolution image, each subset in the second pixel subsets having the second size may include creating the second pixel subsets of the high resolution image, each subset in the second pixel subsets having the first size. Creating the first pixel subsets of the first upscaled image may include creating first non-overlapping pixel subsets of the first upscaled image. Creating second pixel subsets of the high resolution image with the third resolution may include creating second non-overlapping pixel subsets of the high resolution image. Creating the first pixel subsets of the first upscaled image may include creating first overlapping pixel subsets of the first upscaled image. Creating second pixel subsets of the high resolution image with the third resolution may include creating second overlapping pixel subsets of the high resolution image.

In some implementations, determining, for each subset in the first pixel subsets or for each subset in the second pixel subsets, the value of the property of the corresponding pixel subset may include determining, for each subset in the first pixel subsets or for each subset in the second pixel subsets, an angle of an edge in the corresponding pixel subset. Determining, for each subset in the first pixel subsets or for each subset in the second pixel subsets, the value of the property of the corresponding pixel subset may include determining, for each subset in the first pixel subsets or for each subset in the second pixel subsets, a derivative of an edge in the corresponding pixel subset. Determining, for each subset in the first pixel subsets or for each subset in the second pixel subsets, the value of the property of the corresponding pixel subset may include determining, for each subset in the first pixel subsets or for each subset in the second pixel subsets, the value of the property of the corresponding pixel subset using the corresponding pixel subset and at least one pixel subset adjacent to the corresponding pixel subset. Determining, for each subset in the first pixel subsets or for each subset in the second pixel subsets, the value of the property of the corresponding pixel subset may include determining, for each subset in the first pixel subsets or for each subset in the second pixel subsets, the value of the property of the corresponding pixel subset using the corresponding first pixel subset and all pixel subsets adjacent to the corresponding pixel subset.

In some implementations, the method may include compressing the low resolution image prior to upscaling the low resolution image. The method may include sharpening the high resolution image prior to creating the second pixel subsets of the high resolution image. The method may include determining, for each of the groups of subsets, a second filter to apply to each of the final pixel subsets in the group to create a second final pixel subset that approximates the corresponding second pixel subset using the final pixel subset, a combination of all of the second final pixel subsets representing a third upscaled image. Determining, for each of the groups of subsets, the filter to apply to each of the first pixel subsets that correspond to the pixel subsets in the group to create the final pixel subset that approximates the corresponding second pixel subset using the first pixel subset may include determining, for each of the groups of subsets, a horizontal filter to apply to each of the first pixel subsets that correspond to the pixel subsets in the group, and determining, for each of the groups of subsets, a vertical filter to apply to each of the first pixel subsets that correspond to the pixel subsets in the group. Determining, for each of the groups of subsets, the filter to apply to each of the first pixel subsets that correspond to the pixel subsets in the group to create the final pixel subset that approximates the corresponding second pixel subset using the first pixel subset may include determining, for each of the groups of subsets, a unique filter to apply to each of the first pixel subsets that correspond to the pixel subsets in the group that is different from the filters for the other groups.

In some implementations, a data processing apparatus automatically upscales the low resolution image to create the first upscaled image. In some implementations, a system may include a mobile device that includes a data processing apparatus and a computer readable storage medium. In some implementations, a system may include a personal computer that includes a data processing apparatus and a computer readable storage medium. In some implementations, a processor may include an image and signal processor. Determining, for each of the groups of subsets, the filter to apply to each of the first pixel subsets that correspond to the pixel subsets in the group to create the final pixel subset that approximates the corresponding second pixel subset using the first pixel subset may include creating a single filter that upscales the pixel subset and creates the final pixel subset that approximates the corresponding second pixel subset using the first pixel subset.

In general, one innovative aspect of the subject matter described in this specification can be embodied in methods that include the actions of upscaling a low resolution image with a first resolution that depicts particular content to a second resolution greater than the first resolution to create an upscaled image, creating pixel subsets of the upscaled image, each subset in the pixel subsets having a size, each pixel in the upscaled image included in a subset in the pixel subsets, determining, for each subset in the pixel subsets, a value of a property of the pixel subset, determining, for each subset in the pixel subsets, a group of subsets to which the pixel subset belongs using the value of the property of the pixel subset, each pixel subset included in one and only one group, and applying, for each of the groups of subsets, a filter to each of the pixel subsets in the group to create a final pixel subset, a combination of all of the final pixel subsets representing a higher resolution image of the content with a third resolution greater than the first resolution. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by a device, a low resolution image with a first resolution that depicts particular content, creating pixel subsets of the low resolution image, each subset in the pixel subsets having a size, each pixel in the low resolution image included in a subset in the pixel subsets, determining, for each subset in the pixel subsets, a value of a property of the pixel subset, determining, for each subset in the pixel subsets, a group of subsets to which the pixel subset belongs using the value of the property of the pixel subset, each pixel subset included in one and only one group, automatically upscaling the low resolution image to a second resolution greater than the first resolution to create an upscaled image, and applying, for each of the groups of subsets, a filter to each of the pixel subsets in the group to create a final pixel subset, a combination of all of the final pixel subsets representing a higher resolution image of the content with a third resolution greater than the first resolution. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include generating a higher resolution image of the content with the third resolution greater than the first resolution by combining all of the final pixel subsets, and providing the higher resolution image for presentation. The method may include determining weights with which to combine the pixel subsets and the final pixel subsets, and generating a final image by combining the pixel subsets and the final pixel subsets with the weights. Determining the weights with which to combine the pixel subsets and the final pixel subsets may include determining, for each of the pixel subsets, a weight. Determining, for each of the pixel subsets, the weight may include determining, for each of the pixel subsets, whether the pixel subset comprises only noise, for each of the pixel subsets that comprise only noise, determining a weight value of zero for the pixel subset, and for each of the pixel subsets that does not comprise only noise, determining a non zero weight value for the pixel subset. Determining, for each of the pixel subsets, the weight may include determining, for each of the pixel subsets, a similarity between the pixel subset and the corresponding final pixel subset, and determining, for each of the pixel subsets, a weight using the similarity between the pixel subset and the corresponding final pixel subset. Determining, for each of the pixel subsets, the weight may include determining, for each of the pixel subsets, a similarity between a structure of the pixel subset and a structure of the corresponding final pixel subset, and determining, for each of the pixel subsets, a weight using the similarity between the structure of the pixel subset and the structure of the corresponding final pixel subset. Determining, for each of the pixel subsets, the weight using the similarity between the structure of the pixel subset and the structure of the corresponding final pixel subset may include comparing, for each of the pixel subsets, the similarity between the structure of the pixel subset and the structure of the corresponding final pixel subset with a threshold similarity, for each of the pixel subsets that have a similarity that satisfies the threshold similarity, using the corresponding final pixel subset for the higher resolution image, and for each of the pixel subsets that have a similarity that does not satisfy the threshold similarity, using the pixel subset for the higher resolution image.

In some implementations, the method may include receiving the low resolution image. Upscaling the low resolution image with the first resolution that depicts particular content to the second resolution greater than the first resolution to create the upscaled image may include creating the upscaled image with the third resolution. Creating the pixel subsets of the upscaled image may include creating non-overlapping pixel subsets. Creating the pixel subsets of the upscaled image may include creating overlapping pixel subsets. Determining, for each subset in the pixel subsets, the value of the property of the pixel subset may include determining, for each subset in the pixel subsets, an angle of an edge in the pixel subset. Determining, for each subset in the pixel subsets, the value of the property of the pixel subset may include determining, for each subset in the pixel subsets, a derivative of an edge in the pixel subset. Determining, for each subset in the pixel subsets, the value of the property of the pixel subset may include determining, for each subset in the pixel subsets, the value of the property of the respective pixel subset using the respective pixel subset and at least one pixel subset adjacent to the respective pixel subset. Determining, for each subset in the pixel subsets, the value of the property of the pixel subset may include determining, for each subset in the pixel subsets, the value of the property of the respective pixel subset using the respective pixel subset and all pixel subsets adjacent to the respective pixel subset.

In some implementations, the method may include applying, for each of the groups of subsets, a second filter to each of the final pixel subsets in the group to create a second final pixel subset, a combination of all of the second final pixel subsets representing a second higher resolution image of the content with the third resolution. Applying, for each of the groups of subsets, the filter to each of the pixel subsets in the group to create the final pixel subset may include applying, for each of the groups of subsets, a horizontal filter to each of the pixel subsets in the group, and applying, for each of the groups of subsets, a vertical filter to each of the pixel subsets in the group. Applying, for each of the groups of subsets, the filter to each of the pixel subsets in the group to create the final pixel subset may include applying, for each of the groups of subsets, a unique filter to each of the pixel subsets in the group that is different from the filters for the other groups.

In some implementations, upscaling the low resolution image to the second resolution greater than the first resolution to create an upscaled image may include upscaling, by one or more first processors, the low resolution image to create the upscaled image. Applying, for each of the groups of subsets, the filter to each of the pixel subsets in the group to create the final pixel subset may include applying, by one or more second different processors and for each of the groups of subsets, the filter to each of the pixel subsets in the group to create the final pixel subset. Applying, for each of the groups of subsets, the filter to each of the pixel subsets in the group to create the final pixel subset may include applying a single filter that upscales the pixel subset and creates the final pixel subset.

The subject matter described in this specification can be implemented in particular embodiments and may result in one or more of the following advantages. In some implementations, the systems and methods described below allow generation of high resolution images with a high quality more efficiently than other systems and methods, e.g., using fewer computation cycles, less memory, or both. For instance, the systems described below may be faster than other systems that do not use the methods described below. In some implementations, the systems and methods described below allow generation of a high resolution image with a quality similar to that of other, slower processes. In some implementations, the use of hashing during upscaling allows the systems and methods described below to upscale images with less noise in a final image than other systems. In some implementations, the use of hashing during upscaling allows the systems and methods described below to generate sharper upscaled images than other systems. In some implementations, an upscaling training system may reduce the Euclidean distance between a high resolution and an upscaled low resolution image, e.g., an interpolated version of the low resolution image, using global filtering to improve a linear upscaling method, e.g., bilinear interpolation, bicubic interpolation, or lanczos resampling. In some implementations, an upscaling training system that compresses a low resolution image during training generates filters that help remove compression artifacts, suppress aliasing, or both, for an upscaled image during runtime. In some implementations, the systems and methods described below may blend an upscaled low resolution image and filtered patches to reduce noise, reduce halos, sharpen an image, enhance the contrast of an image, allow blending based on the structure of an area or patch, e.g., and not changes in intensity or contrast, or a combination of two or more of these, when generating an output image.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of a process for generating a high resolution image.

Like reference numbers and designations in the various drawings indicate like elements.

DETAILED DESCRIPTION

Overview

Figure 1:
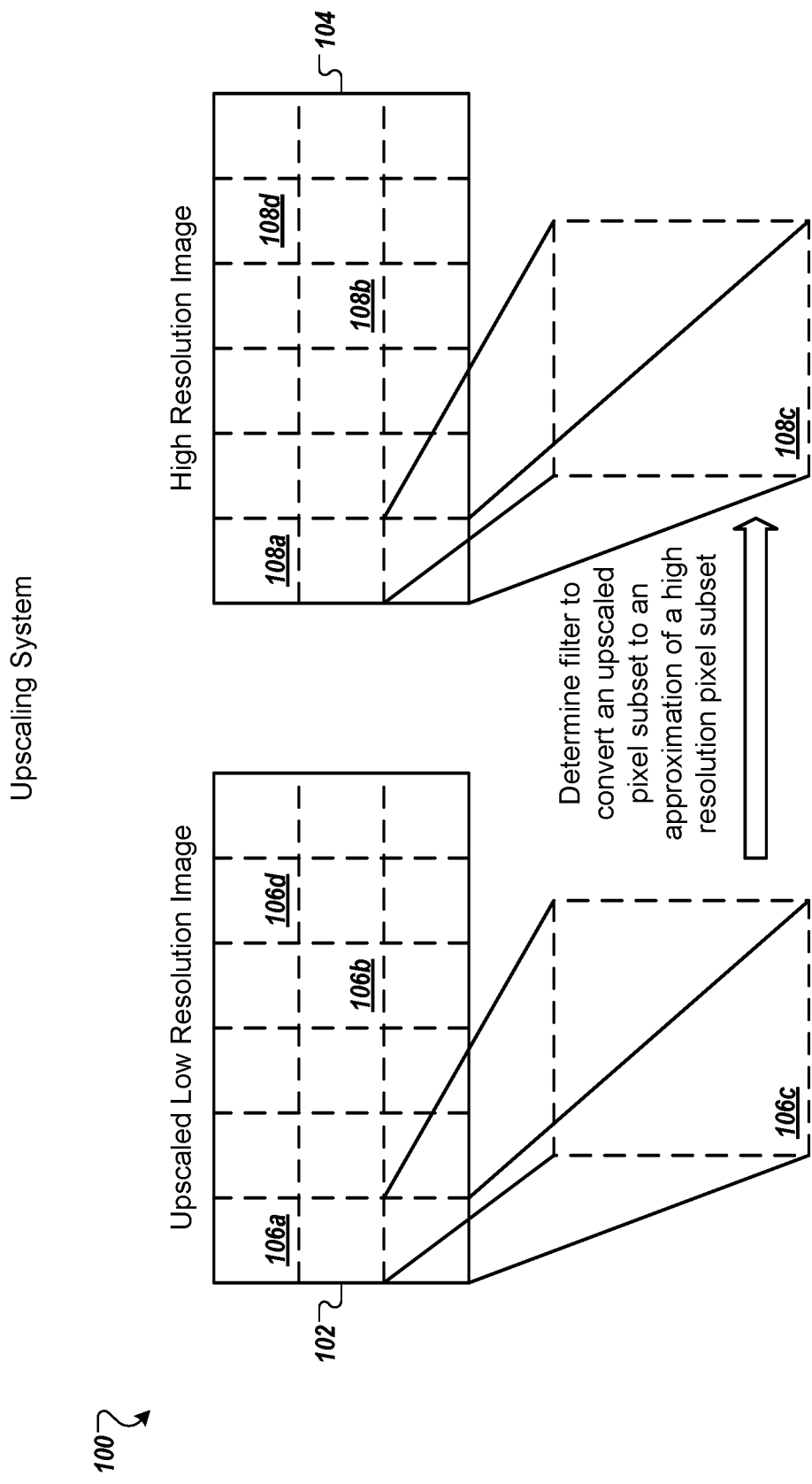
FIG. 1 shows an example of an upscaling system that uses hashing, during training and runtime, to upscale an image.

FIG. 1 shows an example of an upscaling system 100 that uses hashing during training and runtime to upscale an image. In some implementations, the upscaling system may reduce processing time of the image while maintaining quality of the upscaled image compared to other systems.

For instance, during training, an upscaling training system may use a low resolution version of an image and a high resolution version of the image that both depict the same content to generate multiple filters for the upscaling process. The upscaling training system may compress the low resolution image, to introduce additional artifacts in the low resolution image, may sharpen the high resolution image, to create a clearer image, or both, to improve the filters created during training.

The upscaling training system may perform a lightweight upscaling process on the low resolution image, e.g., to create an upscaled low resolution image 102. For example, the upscaling training system may perform bilinear interpolation on the low resolution image. The upscaled low resolution image 102 has the same size, e.g., same number of pixels, as a corresponding high resolution image 104 used during training.

The upscaling training system divides the upscaled low resolution image 102, e.g., the lightweight upscaled low resolution image, and the high resolution image 104 into multiple patches 106a-d and 108a-d respectively, with each patch from a particular image being the same size and the number of patches for the upscaled low resolution image 102 being the same as the number of patches for the high resolution image 104.

The upscaling training system determines a property of each of the patches, either the patches for one of the images or the patches for both of the images. In some examples, the upscaling training system only determines properties for patches from one of the images, e.g., the low resolution image or the high resolution image but not both, and the upscaling training system assumes that the corresponding patch from the other image would have the same value for the property. For instance, when analyzing a patch 106c from the upper left side of the low resolution image, e.g., a patch that is ten by ten pixels, the upscaling training system may determine that an edge represented in the patch has approximately a forty-five degree angle or that the derivative of the angle the edge is ten. The upscaling training system then uses the value of the property for both the patch 106c of the low resolution image 102 and the patch 108c from the high resolution image 104. In some implementations, the upscaling training system determines the properties for the patches 108a-d from the high resolution image 104.

The upscaling training system determines a filter, for each of the patches that have the same value of the property, that most closely upscales the patch 106a-d of the low resolution image 102 to approximate the corresponding patch 108a-d of the high resolution image 104. The upscaling training system performs this process for each of the patches that have the same property value until a threshold value is satisfied and training is completed. The filter may be a mapping of how the modify the pixels from the patch 106a-d in the low resolution image 102 to approximate the pixels in the corresponding patch 108a-d of the high resolution image 104.

For example, if a value of the property of each of the patches 106a-c from the upscaled low resolution image 102 is the same, the upscaling training system determines a single filter to use when upscaling the patches 106a-c to approximate the corresponding patches 108a-c from the high resolution image 104. When a value of the property of the patch 106d is different from the value of the property for each of the patches 106a-c, the upscaling training system determines a different filter for the patch 106d, to use to approximate the patch 108d from the high resolution image 104, compared to a filter used for the patches 106a-c.

An upscaling runtime system uses the determined filters during runtime to upscale images. For example, the upscaling runtime system receives a low resolution image and performs the same lightweight upscaling process as performed during training to generate an upscaled image. The upscaling runtime system divides the upscaled image into patches and determines a property of each of the patches, similar to the process performed during training. The upscaling runtime system applies, for each of the patches with a particular property value or range of property values and using the same value or range of values as determined during training, a filter to the patch and generates a filtered patch. The upscaling runtime system combines all of the filtered patches to create a final image. The upscaling runtime system may provide the final image to another system for presentation, e.g., to a user, or may use the final image, e.g., for additional processing or for presentation.

Example Upscaling Training System

Figure 2:
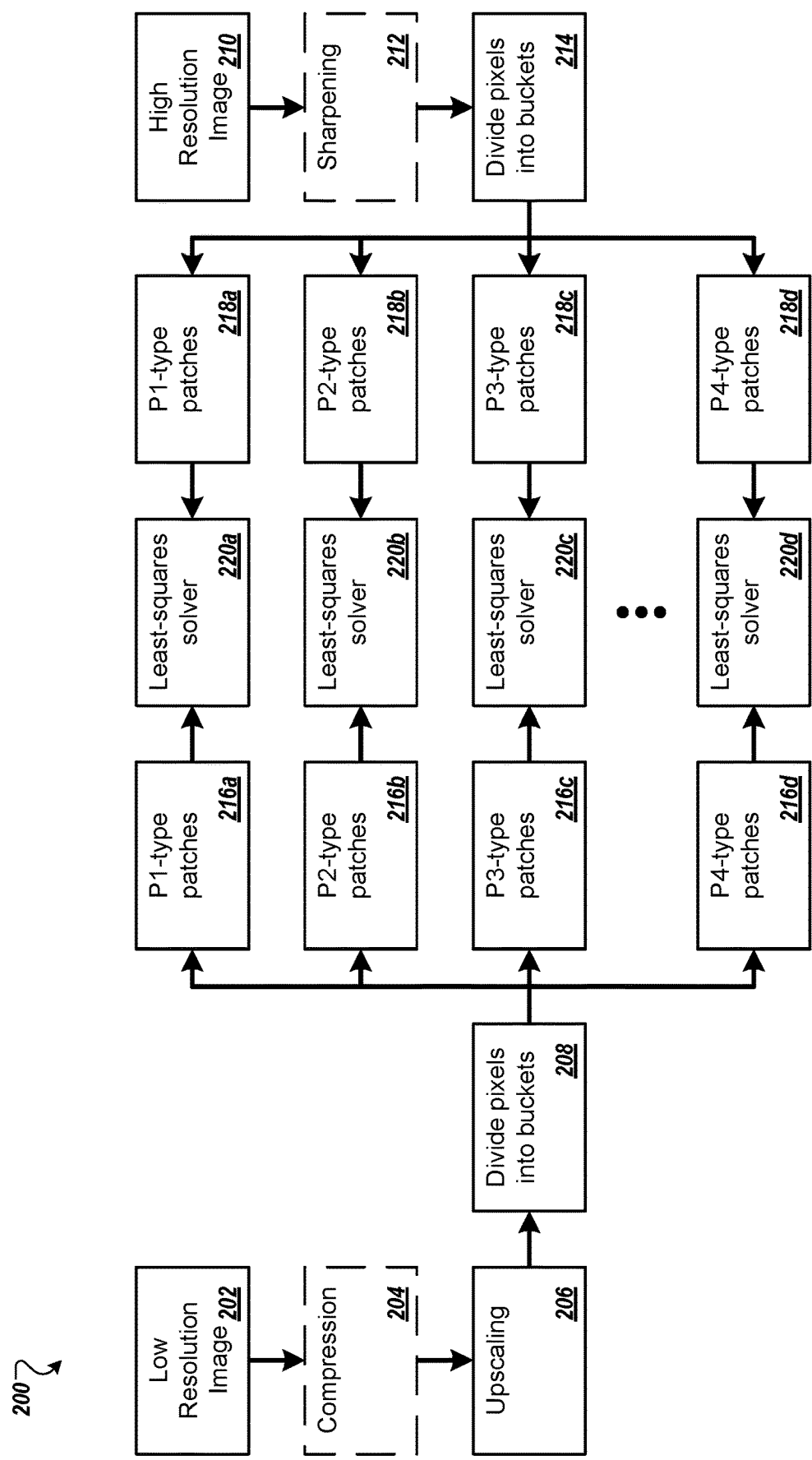
FIG. 2 is an example of an upscaling training system.

FIG. 2 is an example of an upscaling training system 200. The upscaling training system 200 receives a low resolution image 202 and a high resolution image 210 and learns filters for patches of pixels, e.g., using least-squares solvers 220a-d. The upscaling training system 200 provides the filters to an upscaling runtime system for use in upscaling images, e.g., to the upscaling runtime systems of FIGS. 3A-B described in more detail below.

The upscaling training system 200 upscales 206 the low resolution image 202. The upscaling training system 200 may use any appropriate method to perform upscaling 206 of the low resolution image 202. For instance, the upscaling training system 200 may perform bilinear interpolation, bicubic interpolation, or lanczos resampling of the low resolution image 202.

The upscaling training system 200 upscales 206 the low resolution image 202 to a resolution that is the same as the high resolution image 210. For instance, the upscaling training system 200 increases the size of the low resolution image 202 by a factor of two, three, or four when upscaling the low resolution image 202.

The upscaling training system 200 creates patches of the pixels in the upscaled low resolution image. In some examples, the patches of pixels in the upscaled low resolution image are non-overlapping, e.g., each pixel is in one and only one patch. In some examples, the upscaling training system 200 generates overlapping patches. For example, the upscaling training system 200 may generate a patch for each pixel that is centered on the respective pixel.

The upscaling training system 200 determines a value of a property of each of the patches, such as an angle of a gradient for the patch or a derivative of the angle of the gradient for the patch. The upscaling training system 200 may use any appropriate method to determine the value of the property, such as the a tan 2 function to determine the angle of the image gradient for a patch. The upscaling training system 200 may use any appropriate geometric feature of a patch as the property.

For instance, the upscaling training system 200 may generate N×N patches of pixels, or N×M patches of pixels, and determine an angle of a gradient for each of the patches. In some examples, the upscaling training system 200 may apply a modulus 180 function to the obtained angle values, e.g., due to the symmetric property of a unit circle since a filter for an angle α would be the same as the filter for α+180.

The upscaling training system 200 divides 208 the patches of pixels into buckets 216a-d for the low resolution image 202. For example, the upscaling training system 200 may determine a single filter for each bucket of patches 216a-d that have similar values for the property instead of a filter for each distinct value for the property, e.g., to reduce the required computation resources during runtime such as memory and processing time.

In some examples, the upscaling training system 200 may apply a quantization step to divide 208 the pixels into buckets 216a-d, e.g., to reduce computations, to reduce artifacts, or both. For instance, when using an angle of a gradient, the upscaling training system 200 may select a quantization factor from one, e.g., each angle has its own bucket 216a-d, to one-hundred eighty, e.g., each angle is in the same bucket. In some implementations, the upscaling training system 200 may use a quantization value no smaller than seven, preferably a quantization value of twenty-three. In some examples, the upscaling training system 200 may use a quantization value of seven. In some examples, the upscaling training system 200 may use a quantization value between seven and twenty-three. The upscaling training system 200 may select the quantization value as a trade off between quality of a results generated by a runtime upscaling system and execution time of the runtime upscaling system. For instance, an upscaling system may use a greater quantization value for higher quality results while taking longer to perform the upscaling process.

The upscaling training system 200 divides 214 the patches of pixels into buckets 218a-d for the high resolution image 210. In some examples, the patches of pixels in the high resolution image 210 are non-overlapping, e.g., each pixel is in one and only one patch. In some examples, each pixel is included in more than one patch. The upscaling training system 200 may use a method similar to the method used to generate the buckets 216a-d for the low resolution image 202 to generate the buckets 218a-d for the high resolution image 210.

The upscaling training system 200 uses one or more least squares solvers 220a-d to determine filters that use the patches from the upscaled low resolution image to approximate the corresponding patches of the high resolution image 210. For instance, the upscaling training system 200 determines a filter or a mapping to apply to each of the patches in a particular one of the buckets 216a-d for the upscaled low resolution image to generate an approximation of the corresponding patches in a corresponding one of the buckets 218a-d for the high resolution image 210.

When analyzing the patches in a first bucket 216a for the upscaled low resolution image, the upscaling training system 200 may determine a particular filter to apply to each of the patches in the first bucket 216a that maximizes a similarity of an output of the application of the filter to the patches in the first bucket 216a to the corresponding patches in a corresponding first bucket 218a of patches from the high resolution image 210. The upscaling training system 200 performs a similar operation for each of the other buckets 216b-d for the upscaled low resolution image and the buckets 218b-d for the high resolution image 210.

In some implementations, the upscaling training system 200 uses the least-squares solver 220a to learn a filter $h_q$ for the bucket q by dividing the upscaled low resolution image into patches and constructing a matrix A for each of the upscaled low resolution patches. The upscaling training system 200 divides the high resolution image 210 into patches and constructs a vector b for each of the high resolution patches. For instance, the upscaling training system 200 may scan the low resolution image 202 lexicographically, by row or column, to generate the matrix A. The upscaling training system 200 may generate multiple matrices $A_q$ e.g., to form the linear system of equations in blocks indexed by q. The use of multiple matrices Aq by the upscaling training system 200 may reduce the amount of data the upscaling training system 200 processes at a single time. The upscaling training system 200 may scan the high resolution image 210, by row or column, to generate the vector b. When the upscaling training system 200 generates multiple matrices $A_q$, the upscaling training system may generate multiple vectors $b_q$, one for each of the matrices $A_q$.

The upscaling training system 200 determines, for bucket q, the matrices $A_q$ for the upscaled low resolution patches that belong in the bucket q using the determined property of the respective patch. The upscaling training system 200 determines, for bucket q, the vectors $b_q$ for the high resolution patches that belong to bucket q using the determined property for the respective patch. In some examples, the property for the respective patch may be the property of the corresponding patch from the other image, e.g., the property of the high resolution image patch when determining a bucket for the corresponding low resolution image patch.

The upscaling training system 200 may determine the filter $h_q$ using Equation (1) below and the values for the matrices $A_q$ and the vectors $b_q$ that are in the same bucket.

$$\min_{h_q} \|A_q^T A_q h_q - A_q^T b_q\|_2^2 \quad (1)$$

In some implementations, the upscaling training system 200 may process one or more rows of the matrices A separately or in parallel. For instance, the upscaling training system 200 may divide the determination of $A_q^T A_q$, $A_q^T b_q$, or both, into parts which can be processed separately and potentially in parallel. This processing may reduce the amount of memory required by the upscaling training system 200 to determine the filters, may allow the upscaling training system 200 to process tasks for the determination in parallel, or both. For instance, the upscaling training system 200 may determine $A_q^T A_q = \Sigma_j A_{q_j}^T A_{q_j}$ for each submatrix $A_{q_j} \in A_q$. The upscaling training system 200 may determine $A_q^T b_q = \Sigma_j A_{q_j}^T b_{q_j}$ for each submatrix $A_{q_j} \in A_q$.

In some implementations, the upscaling training system 200 learns the filters using the least-squares solvers 220a-d using one pair of input images, e.g., a low resolution image and a high resolution image. In some implementations, the upscaling training system 200 learns the filters using the least-squares solvers 220a-d using multiple pairs of low resolution and high resolution images. Each pair of images depicts the same content or subject matter.

In some implementations, the upscaling training system 200 removes outlier angles. For instance, the upscaling training system 200 use any appropriate despeckling, e.g., noise reduction, method to reduce artifacts. The upscaling training system 200 may despeckle the patches to reduce artifacts, inconsistent angles, or both, in a patch.

In some implementations, the upscaling training system 200 may determine filters for each pixel in a patch and combine the determined filters to determine a filter for the entire patch. For instance, the upscaling training system 200 may determine an average filter by averaging the determined filters.

In some implementations, the upscaling training system 200 compresses 204 the low resolution image 202 before upscaling 206 the low resolution image 202. The upscaling training system 200 may compress 204 the low resolution image 202 to introduce artifacts into the low resolution image 202 to learn filters that will better remove artifacts from low resolution images during runtime. For instance, the upscaling training system 200 compresses the low resolution image 202 to learn filters, using least squares solvers 220a-d, that generate a mapping from compressed low resolution images to their uncompressed high resolution versions. In these implementations, the upscaling training system 200 upscales the compressed low resolution image and creates patches for the upscaled, compressed low resolution image.

In some implementations, the upscaling training system 200 smooths the upscaled low resolution image before dividing 208 the pixels into buckets. For instance, the upscaling training system 200 smooths the upscaled low resolution image to reduce noise, aliasing, compression artifacts, or a combination of two or more of these. The upscaling training system 200 may use any appropriate smoothing algorithm to smooth the upscaled low resolution image. For instance, the upscaling training system 200 may use two linear filters to smooth the upscaled low resolution image, or one filter.

In some implementations, the upscaling training system 200 sharpens the high resolution image 210 before dividing 214 the high resolution image into buckets 218a-d. For instance, the upscaling training system 200 sharpens the high resolution image 210 to reduce noise, degradation, halos, or a combination of two or more of these, to the high resolution image 210. The upscaling training system 200 may use any appropriate method to sharpen the high resolution image 210. The upscaling training system 200 divides 214 the sharpened high resolution image into patches and continues processing using the created sharpened high resolution patches.

Example Upscaling Runtime Systems

Figure 3A:
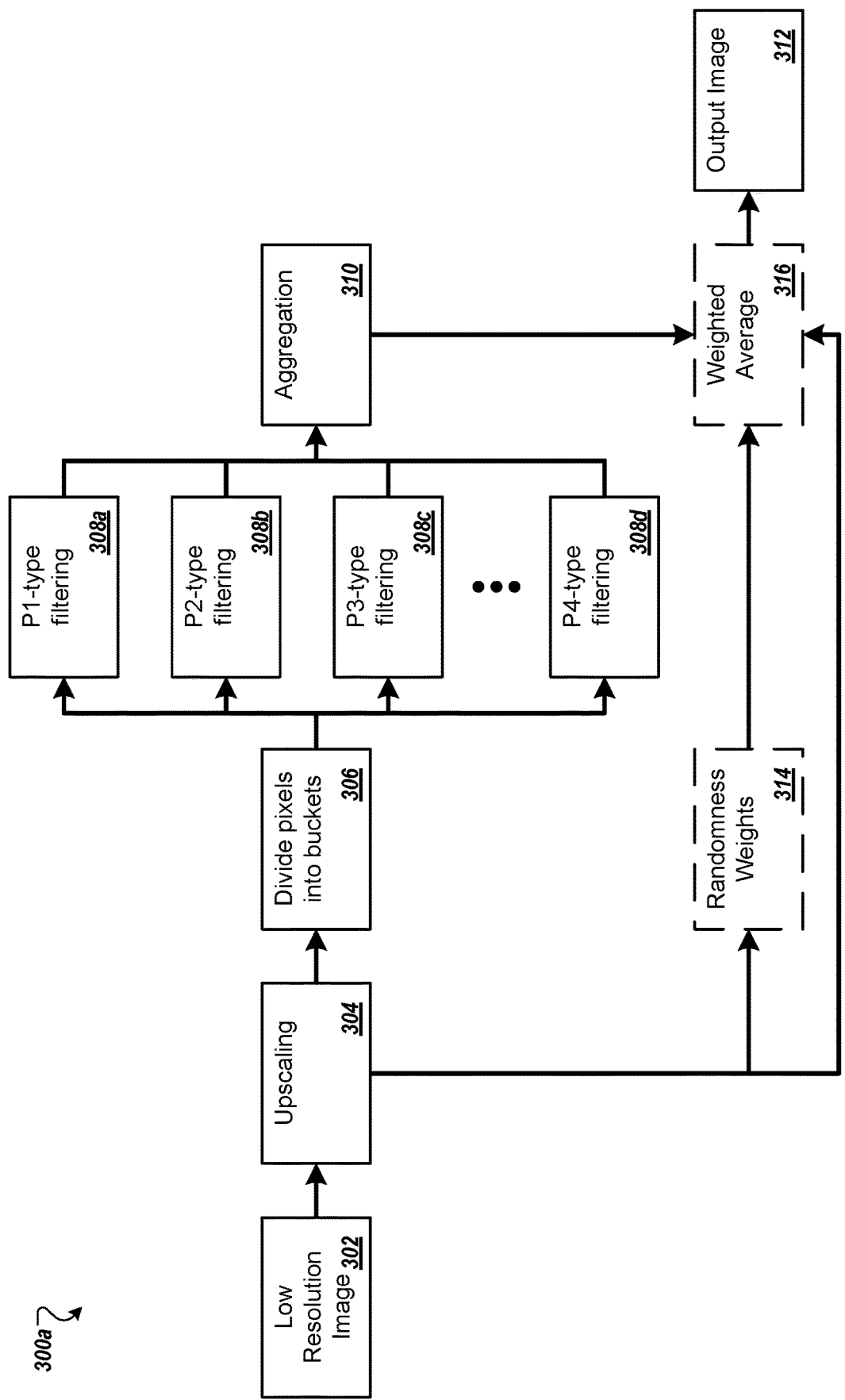
FIGS. 3A-B are examples of upscaling runtime systems.
Figure 3B:
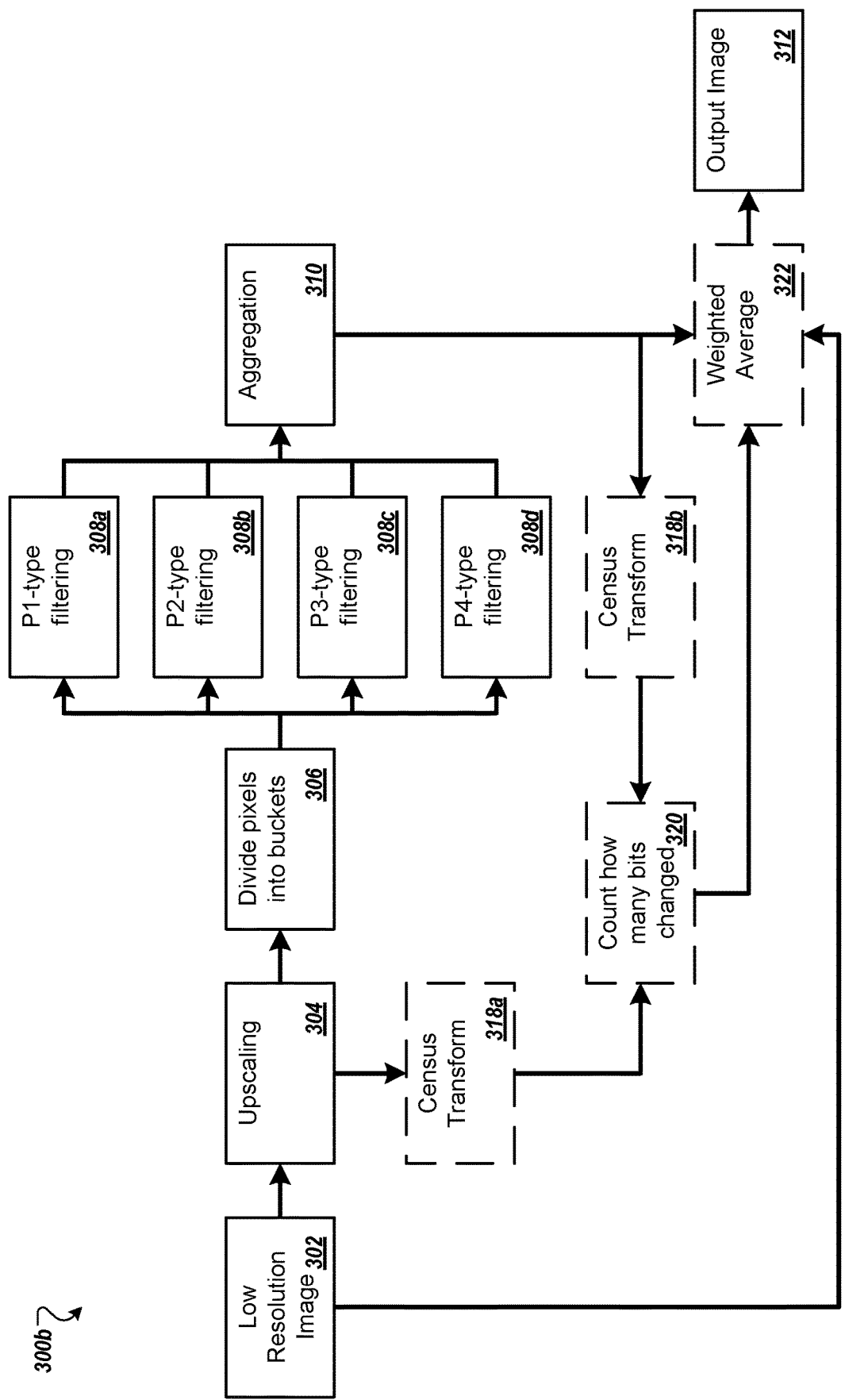

FIGS. 3A-B are examples of upscaling runtime systems 300a-b. The upscaling runtime systems 300a-b use the filters generated by the upscaling training system 200 to upscale low resolution images 302 into higher resolution images, e.g., output images 312. For instance, the upscaling runtime systems 300a-b upscale 304 the low resolution image 302 using the same upscaling method used by the upscaling training system 200, e.g., the same fast, lightweight, or both, upscaling method used by the upscaling training system 200.

The upscaling runtime systems 300a-b a low resolution image 302 as a whole, e.g., and do not upscale individual patches or pixels. For instance, the upscaling runtime system 300a determines filters for each of the patches in the low resolution image 302 and applies each of the determined filters to the patches in the low resolution image 302 at the same time.

The upscaling runtime systems 300a-b create patches of pixels from the upscaled low resolution image and divide 306 the patches of pixels into buckets using the same methods as used by the upscaling training system 200. For instance, the upscaling runtime systems 300a-b determine a property of each of the patches of pixels from the upscaled low resolution image, e.g., an angle of a gradient or a derivative of the angle, and group patches into a bucket with other patches that have a similar property, e.g., using a quantization value.

The upscaling runtime systems 300a-b apply 308a-d filters to the patches of pixels in each of the buckets. For example, the upscaling runtime system 300a-b uses the property of the patches in the same bucket to access a lookup table and determine a filter to apply to each of the patches in the bucket.

The upscaling runtime systems 300a-b aggregate 310 the filtered patches to generate an output image 312. The upscaling runtime systems 300a-b may provide the output image 312 to another system or application for presentation to a user, e.g., on a display of a mobile device.

In some implementations, the upscaling runtime system 300a shown in FIG. 3A may blend the upscaled low resolution image with the aggregated filtered patches using weights to generate the output image 312. For instance, the upscaling runtime system 300a may use a method, e.g., a census transform, to determine randomness weights 314 that reflect a degree to which a pixel patch contains noise or structured content, e.g., a geometric shape. The upscaling runtime system 300a may use weight values between zero and one, inclusive.

The upscaling runtime system 300a uses the randomness weights to generate a weighted average 316 of the upscaled low resolution image and the aggregated filtered patches. The upscaling runtime system 300a uses the randomness weights to determine which patches of the low resolution image 302 contain noise and selects patches from the upscaled low resolution image for the areas of the low resolution image that contain noise. The upscaling runtime system 300a uses the randomness weights to determine which patches of the low resolution image 302 contain structured content, e.g., geometric shapes, and uses the filtered patches for the areas of the low resolution image that contain structured content. The upscaling runtime system 300a may analyze the low resolution image 302, the upscaled low resolution image, the filtered patches, or a combination of two or more of these, to determine whether a patch or area of the image contains noise or structured content.

The upscaling runtime system 300a aggregates the selected patches to generate the output image 312. For instance, the upscaling runtime system 300a aggregates the selected upscaled patches and the selected filtered patches to generate the output image 312.

The upscaling runtime system 300a may use any appropriate method to determine features of the patches or areas of the low resolution image 302 and randomness weight for those patches or areas. The upscaling runtime system 300a may combine portions of the upscaled low resolution image and the aggregated filtered patches using the randomness weights. The upscaling runtime system 300a determines a randomness weight for each area or patch in the low resolution image 302.

In some implementations, the upscaling runtime system 300b, shown in FIG. 3B, may blend the upscaled low resolution image with the aggregated filtered patches using a measure of change to generate the output image 312. For instance, the upscaling runtime system 300b may determine a measure of change between areas or patches in the upscaled low resolution image and the aggregated filtered patches and select an area or a patch from the respective image to use for the respective portion of the output image 312.

In some examples, the upscaling runtime system 300b may determine that the amount of change between the upscaled low resolution image and the aggregated filtered patches for a particular area or a particular patch does not satisfy a threshold amount and use the respective area or patch from the aggregated filtered patches to generate the output image 312. When the upscaling runtime system 300b determines that the amount of change between the upscaled low resolution image and the aggregated filtered patches for a particular area or a particular patch satisfies a threshold amount and use the respective area or patch from the upscaled low resolution image to generate the output image 312. For instance, when an area or patch in the two images is similar, the upscaling runtime system 300b uses the respective area or patch from the aggregated filtered patches, and when an area or patch in the two images is substantially different, the upscaling runtime system uses the respective area or patch from the upscaled low resolution image.

The upscaling runtime system 300b may determine a census transform 318a for each patch in the upscaled low resolution image and a census transform 318b for each patch in the aggregated filtered patches to generate two vectors for each of the patches, one vector for each of the census transforms 318a-b. The upscaling runtime system 300b compares the two vectors to determine or count 320 a number of bits that were changed from the vector for the patch from the upscaled low resolution image to the vector for the filtered patch from the aggregated filtered patches. The upscaling runtime system 300b uses the comparison to determine 322 a weighted average of the areas or patches from the upscaled low resolution image and the aggregated filtered patches using the numbers of bits for the patches to generate the output image 312.

When the number of bits that were changed does not satisfy a threshold value, e.g., is less than the threshold value and the two patches or areas are similar, the upscaling runtime system 300b uses the filtered area or patch for the output image 312. When the number of bits that were changed does satisfies a threshold value, e.g., is great than or equal to the threshold value and the two patches or areas are not similar, the upscaling runtime system 300b uses the upscaled low resolution image area or patch for the output image 312.

Example Upscaling Computer System

Figure 4:
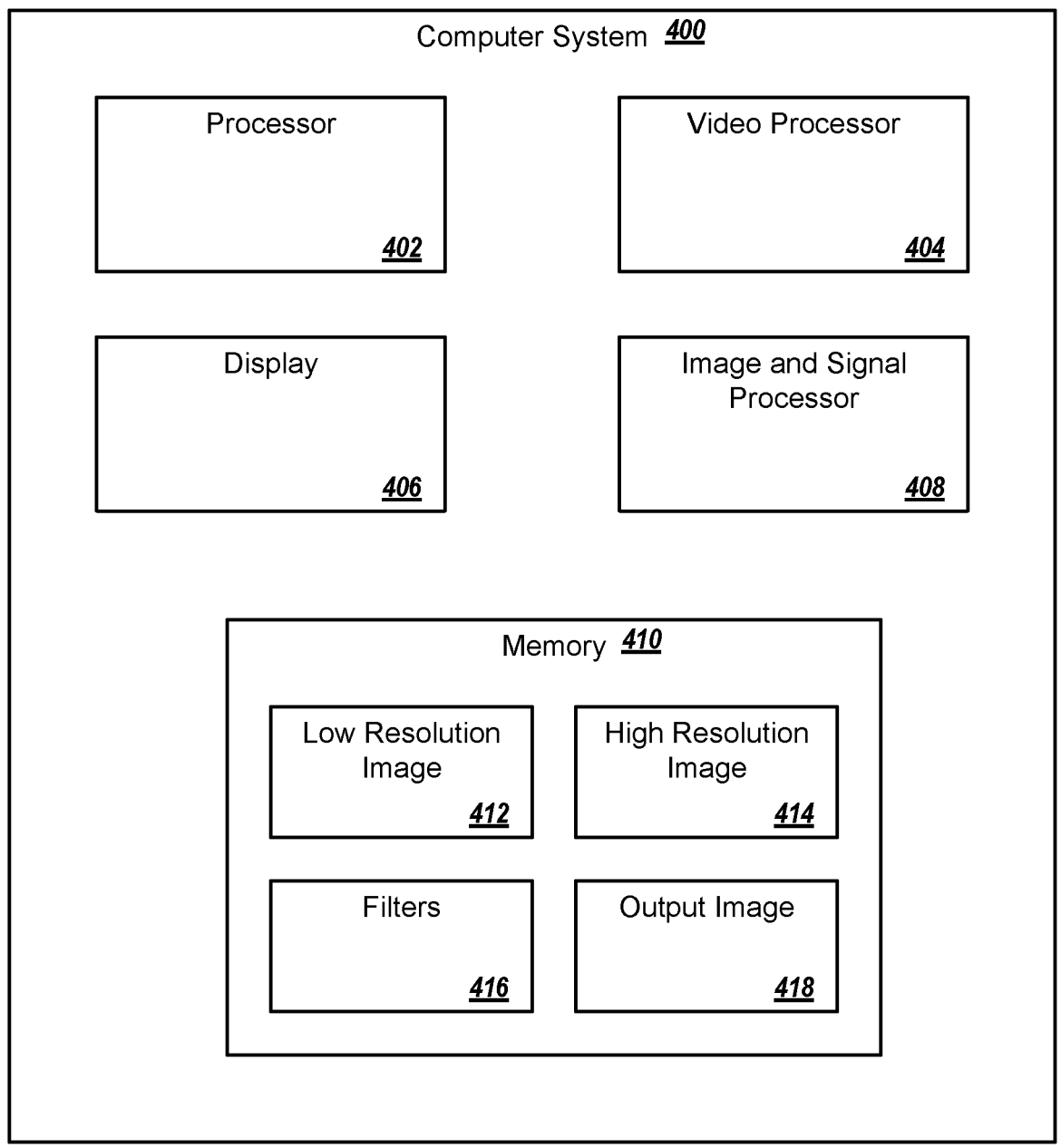
FIG. 4 is an example of a computer system for upscaling images.

FIG. 4 is an example of a computer system 400 for upscaling images, e.g., during training, runtime, or both. In some implementations, the same computer system 400 that generates the filters may use the filters during runtime. In some implementations, a first computer system generates the filters during training and provides the filters to a second computer system, which is a different computer system than the first computer system, for runtime use to upscale images.

The computer system 400 may generate a set of filters 416 for a particular scale to apply to a low resolution image. For instance, the computer system 400 may generate a first set of filters to use when upscaling by a factor of two and a second set of filters to use when upscaling by a factor of three or four.

The computer system 400 includes a processor 402 that receives a low resolution image 412 and a high resolution image 414 from memory 410 during training. The processor 402 generates an upscaled low resolution image from the low resolution image, creates the patches of the upscaled low resolution image and the patches of the high resolution image 414, and determines filters 416 to apply to the low resolution image patches to approximate the corresponding high resolution image patches. The processor 402 stores the filters 416 in the memory 410. The memory 410 may include a single memory or multiple memories.

During a runtime process, the processor 402 in the computer system 400 applies the filters 416 to patches from a low resolution image 412, e.g., typically a different low resolution image than the one used during training, to generate filtered patches. The processor 402 aggregates the filtered patches to generate an output image 418. The processor 402 may use any appropriate method to generate the output image 418 using the patches and the filters 416.

The processor 402 may provide the output image 418, or a reference to the output image 418, to a video processor 404 that causes presentation of the output image 418 on a display 406. In some examples, the video processor 404 may be part of the processor 402 or the processor 402 may perform the function of the video processor 404.

In some implementations, the computer system 400 includes an image and signal processor 408 that processes images. For instance, the image and signal processor 408 may automatically upscale the low resolution image 412, e.g., to the resolution of the display 406 or another resolution.

In these implementations, the processor 402 does not need to upscale the low resolution image 412 and may receive the upscaled low resolution image from the image and signal processor 408. For example, the computer system 400 may receive a command to present the low resolution image 412 on the display 406. The command may be based on input received from a user of the computer system 400 to present the low resolution image 412.

In response to the command, the image and signal processor 408 receives the low resolution image 412 from the memory 410 and upscales the low resolution image to generate an upscaled low resolution image. The processor 402 receives the upscaled low resolution image from the image and signal processor 408 and generates the pixel patches for the upscaled low resolution image. The processor 402 applies the filters to the upscaled low resolution image to generate the output image 418.

In some examples, the processor 402 may apply a single filter to the low resolution image 412 to generate the output image 418. In these examples, the single filter applies both the initial upscaling and the filtering to the low resolution image 412 in a single step without a separate initial, e.g., lightweight, upscaling step.

When the processor 402 weights patches or areas of the low resolution image and combines filtered patches with upscaled patches, the processor 402 may apply a single filter to each patch of the low resolution image 412, i.e., an non-upscaled version of the low resolution image 412, and receive the upscaled low resolution image from the image and signal processor 408. The processor 402 determines the patches for the upscaled low resolution image received from the image and signal processor 408 and determines weights for each of the patches. The processor 402 then combines the patches for the upscaled low resolution image received from the image and signal processor 408 with the filtered patches generated using the single filter. In some examples, the processor 402 automatically upscales the low resolution image 412.

In implementations when the computer system 400 is an upscaling training system and not an upscaling runtime system, the computer system 400 might not include the video processor 404, the display 406, the image and signal processor 408, the output image 418, or two or more of these. In implementations when the computer system 400 in an upscaling runtime system and not an upscaling training system, the computer system might not include the high resolution image. In some examples, the upscaling runtime system might not include the video processor 404, the display 406, or both.

We refer to a computer system 400, but implementations of the upscaling system may use a single computer or multiple computers operating in conjunction with one another, including, for example, a set of remote computers deployed as a cloud computing service. In some examples, the computer system 400 may be a personal computer or a mobile device, e.g., a smart phone, or a wearable device.

Example Training Process Flow

Figure 5:
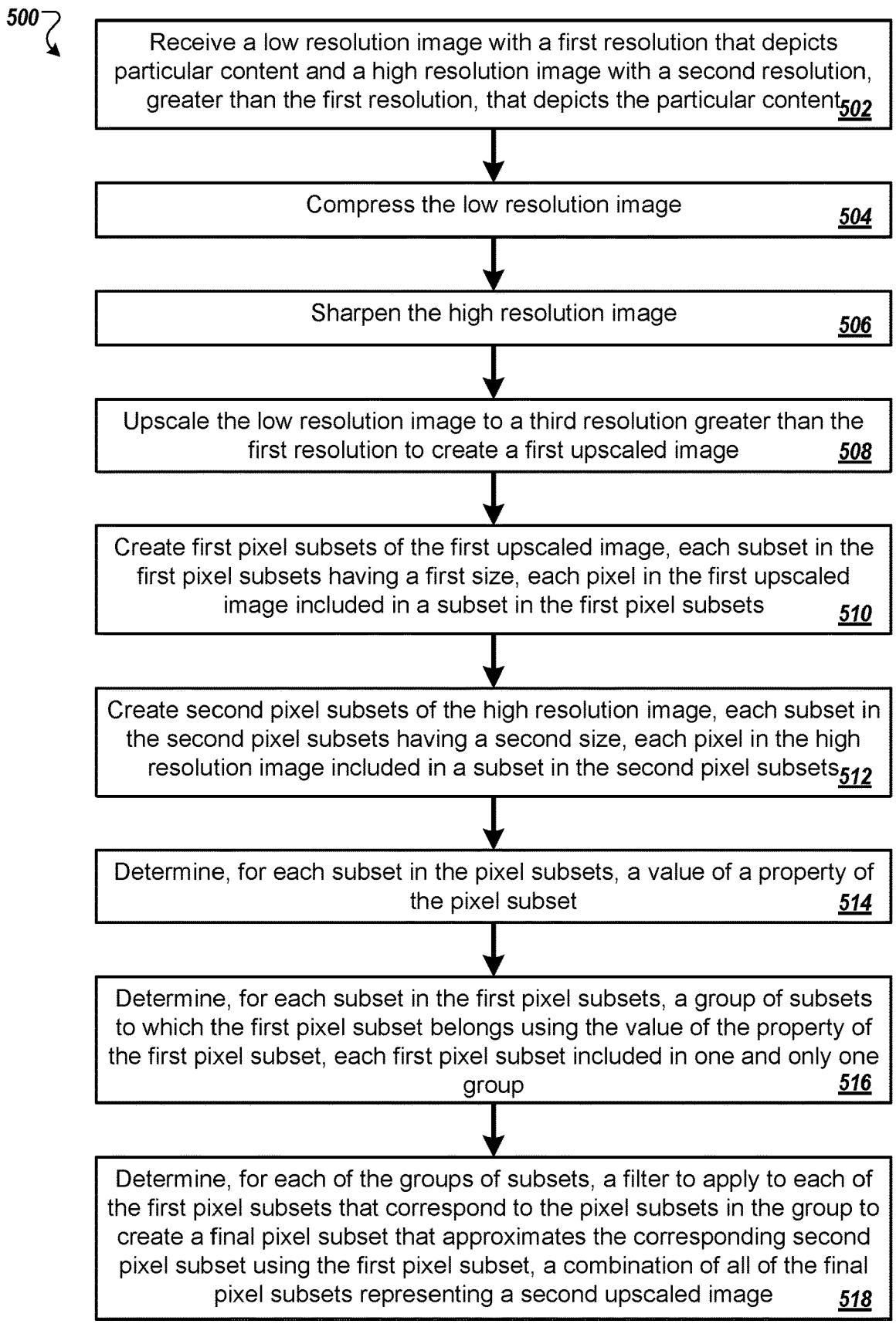
FIG. 5 is a flow diagram of a process for determining filters for image upscaling.

FIG. 5 is a flow diagram of a process 500 for determining filters for image upscaling. For example, the process 500 can be used by the computer system 400 shown in FIG. 4.

An upscaling training system receives a low resolution image with a first resolution that depicts particular content and a high resolution image with a second resolution, greater than the first resolution, that depicts the particular content (502). In some examples, the upscaling training system may receive the high resolution image and generate the low resolution image from the high resolution image, e.g., using any appropriate method. In some implementations, the upscaling system may generate the low resolution image and the high resolution image from the same initial image.

The upscaling training system compresses the low resolution image (504). For example, the upscaling training system uses an image compression method, such as a lossy image compression method, to introduce artifacts in the low resolution image.

The upscaling training system sharpens the high resolution image (506). The upscaling training system may use any appropriate sharpening system to sharpen the high resolution image.

The upscaling training system upscales the low resolution image to a third resolution greater than the first resolution to create a first upscaled image (508). The third resolution may be the same as the second resolution. For instance, the upscaling training system receives a low resolution image with a resolution of one hundred by one hundred and a high resolution image of two hundred by two hundred. The upscaling training system upscales the low resolution image to two hundred by two hundred using a general interpolation method, e.g., a lightweight interpolation method. The upscaling training system may upscale the compressed low resolution image.

The upscaling training system creates first pixel subsets of the first upscaled image, each subset in the first pixel subsets having a first size, each pixel in the first upscaled image included in a subset in the first pixel subsets (510). The upscaling training system creates second pixel subsets of the high resolution image, each subset in the second pixel subsets having a second size, each pixel in the high resolution image included in a subset in the second pixel subsets (512). For example, the upscaling training system creates patches of pixels for the first upscaled image and patches of pixels for the high resolution image. The upscaling training system may create the second pixel subsets from the sharpened high resolution image. Each of the pixel subsets include contiguous pixels, e.g., all of the pixels in a particular subset are adjacent to at least one other pixel in the same subset. In some examples, each pixel in a particular subset is adjacent to at least two other pixels in the particular subset.

The upscaling training system determines, for each subset in the pixel subsets, a value of a property of the pixel subset (514). The upscaling training system may determine any appropriate value of a geometric property. The upscaling training system may determine the value of a property for each subset in the first pixel subsets. The upscaling training system may determine the value of a property for each subset in the second pixel subsets. In some examples, the upscaling training system determines a value of a property for the subsets in either the first pixel subsets or the second pixel subsets and not both.

In some implementations, the upscaling training system, and the later runtime system, may use a contrast of an edge in the pixel subset. For instance, the upscaling system may use a relative brightness or a color difference between either side of the edge in the pixel subset. In some examples, the upscaling system may use a combination of different properties for the pixel subsets, e.g., a combined value of two or more properties or different properties for different pixel subsets based on the values of the properties.

The upscaling training system determines, for each subset in the first pixel subsets, a group of subsets to which the first pixel subset belongs using the value of the property of the first pixel subset, each first pixel subset included in one and only one group (516). The upscaling training system determines buckets for each of the pixel subsets such that the pixel subsets in the bucket have the same or a similar property. The upscaling training system may use any appropriate method to determine the groups of subsets, such as by using a quantization value and applying the quantization value to the determined values of the property. In some implementations, the upscaling training system determines a group of subsets to which a second pixel subset belongs for each pixel subset in the second pixel sub sets.

When the upscaling training system determines a value of the property for the subsets in the first pixel subsets, the upscaling training system determines a group of subsets for each subset in the first pixel subsets. When the upscaling training system determines a value of the property for the subsets in the second pixel subsets, the upscaling training system may determine a group of subsets for each subset in the first pixel subsets or a group of subsets for each subset in the second pixel subsets. For instance, the upscaling training system may use the value of the property of a particular second pixel subset to determine a group of subsets to which the particular second pixel subset belongs. In some examples, the upscaling training system uses the value of the property of a particular second pixel subset to determine a group of subsets to which a corresponding particular first pixel subset belongs. For instance, when the value of the property is for the high resolution patch 108d, e.g., a second pixel subset, the upscaling training system may use the value of the property to determine a group of subsets for the upscaled low resolution patch 106d and place the upscaled low resolution patch 106d in the determined group of subsets.

The upscaling training system determines, for each of the groups of subsets, a filter to apply to each of the first pixel subsets that correspond to the pixel subsets in the group to create a final pixel subset that approximates the corresponding second pixel subset using the first pixel subset, a combination of all of the final pixel subsets representing a second upscaled image (518). The upscaling training system may determine filters for each of the subsets in a group separately or jointly. In some examples, the upscaling training system combines multiple filters, each for different subsets in the group, to determine a single filter for the group.

In some implementations, the upscaling system determines, for each of the groups of subsets, a filter to apply to each of the first pixel subsets that correspond to the pixel subsets in the group to create a final pixel subset that approximates the corresponding second pixel subset using the first pixel subset when the groups of subsets include first pixel subsets. For example, when the groups of subsets include a first group with the upscaled low resolution patches 106*a-c* and a second group with the upscaled low resolution patch 106*d*, e.g., first pixel subsets, the upscaling system determines a first filter to apply to the upscaled low resolution patch 106*a*, the upscaled low resolution patch 106*b*, and the upscaled low resolution patch 106*c* that generates final patches that each approximate one of the high resolution patch 108*a*, the high resolution patch 108*b*, and the high resolution patch 108*c*, respectively. The upscaling system determines a second filter to apply to the upscaled low resolution patch 106*d* that generates a final patch that approximates the high resolution patch 108*d*. The upscaling system performs this process for all of the groups of subsets, e.g., all of the groups of pixel patches.

In some implementations, the upscaling system determines, for each of the groups of subsets, a filter to apply to each of the first pixel subsets that correspond to the pixel subsets in the group to create a final pixel subset that approximates the corresponding second pixel subset using the first pixel subset when the groups of subsets include second pixel subsets. For example, the groups of subsets include a first group that includes the high resolution patches 108*a-c* and a second group that includes the high resolution patch 108*d*. The upscaling system determines a first filter to apply to the upscaled low resolution patches 106*a-c* which correspond to the high resolution patches 108*a-c* that are included in the first group. The upscaling system determines the first filter such that by applying the first filter to each of the upscaled low resolution patches 106*a-c* the upscaling system generates final patches that approximate the corresponding high resolution patches 108*a-c*. The upscaling system determines a second filter to apply to the upscaled low resolution patch 106*d* which corresponds to the high resolution patch 108*d* that is included in the second group. The upscaling system determines the second filter so that application of the second filter to the upscaled low resolution patch 106*d* generates a final patch that approximates the high resolution patch 108*d*. The upscaling system performs this process for all of the groups of subsets, e.g., all of the groups of pixel patches.

The order of steps in the process 500 described above is illustrative only, and the determination of the filters for image upscaling can be performed in different orders. For example, the upscaling training system may create the second pixel subsets and then create the first pixel subsets. In some examples, the upscaling training system may sharpen the high resolution image, create the second pixel subsets from the sharpened high resolution image, and then compress the low resolution image. In some implementations, the upscaling training system may compress the low resolution image, upscale the compressed low resolution image, create the first pixel subsets from the upscaled, compressed low resolution image, and then sharpen the high resolution image, create the second pixel subsets, or both.

In some implementations, the process 500 can include additional steps, fewer steps, or some of the steps can be divided into multiple steps. For example, the process 500 may include steps 502, and 508 through 518 without one or both of steps 504 or 506.

Example Runtime Process Flow

FIG. 6 is a flow diagram of a process 600 for generating a high resolution image. For example, the process 600 can be used by the computer system 400 shown in FIG. 4.

An upscaling runtime system receives a low resolution image with a first resolution that depicts particular content (602). The upscaling runtime system may receive the low resolution image in response to a user request to present the low resolution image. In some examples, the upscaling runtime system may receive the low resolution image from another system that requests presentation of the low resolution image on a display, e.g., as part of a web page.

The upscaling runtime system upscales the low resolution image to a second resolution greater than the first resolution to create an upscaled image (604). For example, the upscaling runtime system determines a resolution of a display on which a final image will be presented. The upscaling runtime system determines the second resolution using the resolution of the display on which the final image will be presented. In some examples, the upscaling runtime system may determine the second resolution using other information about the presentation of the final image.

The upscaling runtime system creates pixel subsets of the upscaled image, each subset in the pixel subsets having a size, each pixel in the upscaled image included in a subset in the pixel subsets (606). The upscaling runtime system may create the same size pixel subsets as the pixel subsets created by the upscaling training system during training to generate the filters.

The upscaling runtime system determines, for each subset in the pixel subsets, a value of a property of the pixel subset (608). The upscaling runtime system uses the same property as the property used by the upscaling training system during training to generate the filters.

The upscaling runtime system determines, for each subset in the pixel subsets, a group of subsets to which the pixel subset belongs using the value of the property of the pixel subset, each pixel subset included in one and only one group (610). The upscaling runtime system may use any appropriate method to determine the groups of subsets. The upscaling runtime system uses the same method as the method used by the upscaling training system when generating the filters.

The upscaling runtime system applies, for each of the groups of subsets, a filter to each of the pixel subsets in the group to create a final pixel subset, a combination of all of the final pixel subsets representing a higher resolution image of the content with a third resolution greater than the first resolution (612). The upscaling runtime system generates the final pixel subsets by applying the filters to the pixel subsets.

In some examples, the upscaling runtime system may use some of the filters but not all of the filters when creating the final pixel subsets. For instance, the upscaling runtime system may receive twelve filters from the upscaling training system and use only ten of the twelve filters based on the groups of the pixel subsets for a particular low resolution image.

The upscaling runtime system determines weights with which to combine the pixel subsets and the final pixel subsets (614). For example, the upscaling runtime system may determine whether to use a pixel subset from the upscaled low resolution image or from the filtered pixel subsets when generating a final image.

The upscaling runtime system generates a final image by combining the pixel subsets and the final pixel subsets with the weights (616). The upscaling runtime system may weight the pixel values in both of the pixel subsets, e.g., on a scale from zero to one, or may use the pixel values from one pixel subset or the other depending on the weights.

The upscaling runtime system provides the final image for presentation (618). For instance, the upscaling runtime system provides the final image to a video processor for presentation on a display.

The order of steps in the process 600 described above is illustrative only, and the generation of the high resolution image can be performed in different orders. For example, the upscaling runtime system may create the pixel subsets and then upscale the low resolution image.

In some implementations, the process 600 can include additional steps, fewer steps, or some of the steps can be divided into multiple steps. For example, the process 600 may include steps 602 through 612. In some examples, the process 600 may include steps 602 through 616 and not step 618. In some implementations, an upscaling runtime system may apply a single filter to a pixel subset that upscaling the pixel subset and maps the pixel subset to a filtered pixel subset that approximates a higher resolution version of the pixel subset, e.g., the upscaling runtime system performs steps 604 and 612 in a single step.

Optional Implementation Details

In some implementations, an upscaling system may determine a value of a property of a particular patch using information from patches immediately adjacent to the particular patch without any intervening patches. For instance, an upscaling system may determine an angle of a gradient for a particular patch using the particular patch and four adjacent patches, e.g., the patches immediately above, below, to the left and to the right of the particular patch without any intervening patches. In some examples, an upscaling system may determine a property of a patch using information from all of the patches immediately adjacent to the particular patch.

When an upscaling training system uses information from multiple patches to determine a value of a property for a particular patch to generate a set of filters, an upscaling runtime system that uses the generated filters uses information from multiple patches to determine a value of the property for a particular patch during runtime. The set of multiple patches immediately adjacent to a particular patch used to determine the value of the property is the same during training and runtime.

In some implementations, an upscaling system may apply multiple filters to content from a low resolution image to generate an output image. For example, the upscaling system may use a low resolution image to generate an upscaled low resolution image, and then generate a first filtered image by applying first filters to pixel patches from the upscaled low resolution image. The upscaling system may generate a second filtered image by applying second filters to pixel patches from the first filtered image, e.g., in a manner similar to the generation of the first filtered image. The upscaling system may repeat the application of filters to patches from the filtered images until determining that a threshold has been reached. The threshold may be a number of filtering iterations, a desired quality of an output image, or another threshold value.

In some implementations, an upscaling system may determine separate horizontal and vertical filters to apply to pixel patches in a bucket of pixel patches. For instance, the upscaling system may determine a horizontal filter and a vertical filter during a training process. The upscaling system may use the horizontal filter and then the vertical filter during runtime, in the same order as used during training, or provide the horizontal filter and the vertical filter to another system for use during runtime, e.g., in the same order as used during training. In some examples, the upscaling system may determine the vertical filter and then the horizontal filter during training and then apply the vertical filter and then the horizontal filter during runtime.

In some implementations, an upscaling system determines a unique filter to apply to each bucket of patches. For instance, an upscaling training system determines a first filter to apply to a first bucket of pixel patches and a second filter to apply to a second bucket of pixel patches such that the first filter is a different filter than the second filter when the first bucket of pixel patches is a different bucket, and includes different patches, than the second bucket of pixel patches.

In some implementations, each pixel is included in one and only one pixel patch or pixel subset. In some implementations, each pixel patch or pixel subset is included in one and only one bucket or group of pixel subsets.

In some implementations, an upscaling system may create pixel patches and determine a property of the pixel patches before upscaling the low resolution image. For instance, the upscaling system, whether an upscaling training system or an upscaling runtime system, may apply a single filter to the patches of the low resolution image that performs both a lightweight upscaling process and a high quality upscaling process to generate a high resolution output image.

In some implementations, an upscaling system may implement pixel buckets using a lookup table. For instance, the upscaling training system 200 may store each angle value in the lookup table and an identifier for the corresponding filter to apply to a patch that has the respective gradient angle. In these implementations, an output of the upscaling training system 200 may be a mapping between the entries in the lookup table and the identifiers for the filters, e.g., a hash table key that points to the relevant locally adaptive filters.

In some implementations, when an upscaling runtime system combines filtered patches with upscaled patches, e.g., from an upscaled low resolution image, the upscaling system may analyze each patch or bucket of patches before filtering to determine whether or not the corresponding patch or patches in the bucket should be filtered. For instance, the upscaling runtime system may determine whether a patch, or each patch in a bucket, contain noise. When the upscaling runtime system determines that a particular patch or bucket of patches contains noise, the upscaling runtime system does not filter the particular patch or patches in the bucket of patches. When the upscaling runtime system determines that a particular patch or bucket of patches does not contain noise, e.g., and contains structured content, the upscaling runtime system filters the particular patch or patches in the bucket of patches. The upscaling runtime system combines the filtered patches with the upscaled patches that were not filtered to generate an output image.

Additional Implementation Details

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 7:
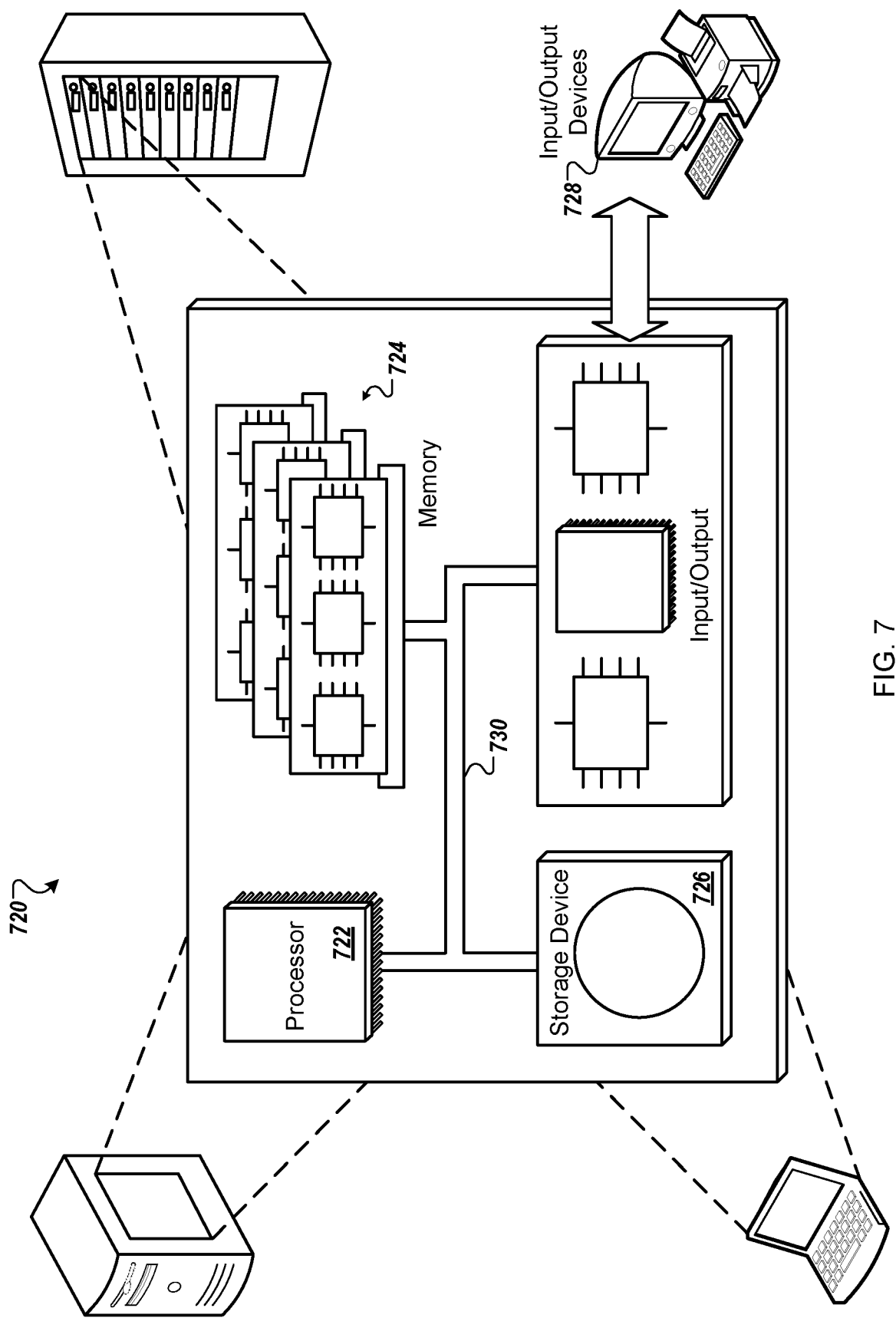
FIG. 7 is a block diagram of a computing system that can be used in connection with computer-implemented methods described in this document.

An example of one such type of computer is shown in FIG. 7, which shows a schematic diagram of a generic computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous. In some implementations, part or all of an upscaling system, e.g., an upscaling runtime system, may be implemented in a Field Programmable Gate Array (FPGA). For example, a lightweight interpolation method may be implemented in an image and signal processor and the rest of the upscaling method may be implemented in an FPGA.

What is claimed is:

1. A computer-implemented method comprising:
   upscaling a low resolution image with a first resolution that depicts particular content to a second resolution greater than the first resolution to create an upscaled image;
   creating, using the upscaled image, multiple patches of the upscaled image that each include one or more pixels from the upscaled image, each pixel in the upscaled image included in a patch from the multiple patches;
   assigning each patch in the multiple patches to a bucket from multiple buckets using a value of a property of the respective patch, each of the buckets from the multiple buckets having a different value of the property;
   determining, for each bucket in the multiple buckets, a filter to apply to each of the patches in the respective bucket to create a corresponding filtered patch; and
   applying, for each bucket in the multiple buckets, the determined filter to each of the patches in the bucket to create the corresponding filtered patch, a combination of all of the filtered patches representing a higher resolution image of the particular content with a third resolution greater than the first resolution.

2. The method of claim 1, wherein determining, for each bucket in the multiple buckets, the filter to apply to each of the patches in the respective bucket to create the corresponding filtered patch comprises:
   for each bucket in the multiple buckets:
      determining, using the value of the property for the patches in the respective bucket, an entry for the respective bucket in a lookup table; and
      in response to determining the entry, determining a filter identifier specified by the entry for the respective bucket in the lookup table, the filter identifier specifying the filter to apply to each of the patches in the respective bucket to create the corresponding filtered patch.

3. The method of claim 2, wherein the lookup table comprises a hash table.

4. The method of claim 3, wherein determining the entry for the respective bucket in the lookup table comprises:
   hashing the value of the property for the respective bucket; and
   using the hash of the value as a key to the hash table to determine the entry for the respective bucket.

5. The method of claim 1, wherein assigning each patch in the multiple patches to a bucket from the multiple buckets comprises:
   for each patch in the multiple patches:
      determining a value of the property using data for the respective patch; and
      in response to determining the value of the property, selecting, as the bucket to which the respective patch will be assigned, the bucket with the value of the property that was determined for the respective patch, wherein each patch in the bucket has the same value of the property.

6. The method of claim 5, wherein determining the value of the property using data for the respective patch comprises determining the value of the property of the respective patch using the data for the respective patch and data for at least one patch adjacent to the respective patch.

7. The method of claim 5, wherein determining the value of the property using data for the respective patch comprises determining the value of the property of the respective patch using the data for the respective patch and data for all patches adjacent to the respective patch.

8. The method of claim 1, comprising:
generating a higher resolution image that i) depicts the particular content and ii) has the third resolution greater than the first resolution by combining all of the filtered patches; and
providing the higher resolution image for presentation.

9. The method of claim 1, comprising:
determining weights with which to combine the patches and the filtered patches; and
generating a higher resolution image by combining the patches and the filtered patches with the weights.

10. The method of claim 9, wherein determining the weights with which to combine the patches and the filtered patches comprises determining, for each of the patches, a weight.

11. The method of claim 10, wherein determining, for each of the patches, the weight comprises:
determining, for each of the patches, whether the patch comprises only noise;
for each of the patches that comprise only noise, determining a weight value of zero for the patch; and
for each of the patches that does not comprise only noise, determining a non-zero weight value for the patch.

12. The method of claim 10, wherein determining, for each of the patches, the weight comprises:
determining, for each of the patches, a similarity between the patch and the corresponding filtered patch; and
determining, for each of the patches, a weight using the similarity between the patch and the corresponding filtered patch.

13. The method of claim 10, wherein determining, for each of the patches, the weight comprises:
determining, for each of the patches, a similarity between a structure of the patch and a structure of the corresponding filtered patch; and
determining, for each of the patches, a weight using the similarity between the structure of the patch and the structure of the corresponding filtered patch.

14. The method of claim 13, wherein determining, for each of the patches, the weight using the similarity between the structure of the patch and the structure of the corresponding filtered patch comprises:
comparing, for each of the patches, the similarity between the structure of the patch and the structure of the corresponding filtered patch with a threshold similarity;
for each of the patches that have a similarity that satisfies the threshold similarity, using the corresponding filtered patch for the higher resolution image; and
for each of the patches that have a similarity that does not satisfy the threshold similarity, using the patch for the higher resolution image.

15. The method of claim 1, wherein creating the multiple patches of the upscaled image comprises creating non-overlapping patches.

16. The method of claim 1, wherein determining, for each bucket in the multiple buckets, the filter to apply to each of the patches in the respective bucket to create the corresponding filtered patch comprises determining, for each bucket in the multiple buckets, a unique filter to apply to each of the patches in the respective bucket to create a corresponding filtered patch.

17. The method of claim 1, comprising receiving the low resolution image.

18. The method of claim 1, wherein the second resolution is the same resolution as the third resolution.

19. A system comprising:
a data processing apparatus; and
a non-transitory computer readable storage medium in data communication with the data processing apparatus and storing instructions executable by the data processing apparatus and upon such execution cause the data processing apparatus to perform operations comprising:
upscaling a low resolution image with a first resolution that depicts particular content to a second resolution greater than the first resolution to create an upscaled image;
creating, using the upscaled image, multiple patches of the upscaled image that each include one or more pixels from the upscaled image, each pixel in the upscaled image included in a patch from the multiple patches;
assigning each patch in the multiple patches to a bucket from multiple buckets using a value of a property of the respective patch, each of the buckets from the multiple buckets having a different value of the property;
determining, for each bucket in the multiple buckets, a filter to apply to each of the patches in the respective bucket to create a corresponding filtered patch; and
applying, for each bucket in the multiple buckets, the determined filter to each of the patches in the bucket to create the corresponding filtered patch, a combination of all of the filtered patches representing a higher resolution image of the particular content with a third resolution greater than the first resolution.

20. A non-transitory computer readable storage medium storing instructions executable by a data processing apparatus and upon such execution cause the data processing apparatus to perform operations comprising:
upscaling a low resolution image with a first resolution that depicts particular content to a second resolution greater than the first resolution to create an upscaled image;
creating, using the upscaled image, multiple patches of the upscaled image that each include one or more pixels from the upscaled image, each pixel in the upscaled image included in a patch from the multiple patches;
assigning each patch in the multiple patches to a bucket from multiple buckets using a value of a property of the respective patch, each of the buckets from the multiple buckets having a) the same value of the property for each of the patches in the respective bucket, and b) a different value of the property than the value of the property for the other buckets;
for each bucket in the multiple buckets:
selecting, from a set of multiple filters, a filter to apply to each of the patches in the respective bucket to create a corresponding filtered patch, each bucket in the multiple buckets having a different filter from the set of multiple filters; and creating, for each of the patches in the respective bucket, the corresponding filtered patch by changing values for one or more pixels in the respective patch using the selected filter, a combination of all of the filtered patches for all buckets in the multiple buckets representing a higher resolution image of the particular content with a third resolution greater than the first resolution.

\* \* \* \* \*